United States Patent
Strickling, III

[11] Patent Number: 6,137,471
[45] Date of Patent: *Oct. 24, 2000

[54] HIGH SPEED GRAPHICS FILL OF LIQUID CRYSTAL DISPLAY

[75] Inventor: James E. Strickling, III, Duluth, Ga.

[73] Assignees: L-3 Communications Corporation, New York, N.Y.; Universal Avionics Systems Corporation-Intruments Division, Norcross, Ga.

[*] Notice: This patent is subject to a terminal disclaimer.

[21] Appl. No.: 09/190,813

[22] Filed: Nov. 12, 1998

Related U.S. Application Data

[63] Continuation of application No. 08/557,887, Jul. 24, 1995, Pat. No. 5,872,553.

[51] Int. Cl.[7] .................................................. G09G 5/36
[52] U.S. Cl. .................... 345/133; 345/443; 345/441; 701/4
[58] Field of Search ............................... 345/133, 507, 345/440–443; 340/971, 978, 945; 701/3, 4, 6, 8, 7, 24, 28, 207, 214; 382/181, 203

[56] References Cited

U.S. PATENT DOCUMENTS

| | | | |
|---|---|---|---|
| 3,418,459 | 12/1968 | Purdy | 395/143 |
| 4,208,719 | 6/1980 | Lotz | 395/143 |
| 4,545,070 | 10/1985 | Miyagawa | 345/118 |
| 4,570,233 | 2/1986 | Yan | 345/118 |
| 4,623,880 | 11/1986 | Bresenham et al. | 345/118 |
| 4,763,119 | 8/1988 | Matsubara et al. | 395/133 |
| 4,876,488 | 10/1989 | Gentile | 315/378 |
| 4,905,166 | 2/1990 | Schuerman | 364/518 |
| 4,910,513 | 3/1990 | Kelly et al. | 340/975 |
| 5,195,177 | 3/1993 | Kamiyama et al. | 345/118 |
| 5,303,321 | 4/1994 | Peaslee et al. | 395/133 |
| 5,598,182 | 1/1997 | Berend et al. | 345/133 |
| 5,872,553 | 2/1999 | Strickling | 345/133 |

*Primary Examiner*—Lun-Yi Lao
*Attorney, Agent, or Firm*—Standley & Gilchrest LLP

[57] ABSTRACT

A method is provided for increasing the speed at which a graphics image is displayed on a raster, such as in a liquid crystal display. The method incorporates off-line created look-up tables which are stored in a memory associated with a graphics processor unit. Thus, real time calculations are reduced resulting in a faster graphics image response time.

9 Claims, 6 Drawing Sheets

HIGH SPEED GRAPHICS FILL OF LIQUID CRYSTAL DISPLAY

BACKGROUND AND SUMMARY OF THE INVENTION

This is a continuation application of U.S. application Ser. No. 08/557,887 filed Jul. 24, 1995, U.S. Pat. No. 5,872,553.

The present invention relates generally to raster displays, and more particularly, to a means by which a graphics image may be generated on a raster display, such as a liquid crystal display device.

Liquid crystal display devices are used for a number of different applications in several different industries. For example, in the aircraft industry, liquid crystal displays are used for flight instruments such as altitude direction indicators and horizontal situation indicators. It is desirable to form a graphical image on the screen of a display as quickly as possible. For example, a military aircraft operating at high speeds, and capable of a broad range of maneuvers, requires a rapidly changeable graphics display to constantly provide the pilot with current information related to the orientation of the aircraft at any given instant in flight. A display that is relatively slow to respond could potentially have dangerous consequences for a pilot. Therefore, a need exists to provide a high speed graphics screen fill of a liquid crystal display that is capable of instantaneous change in response to information received from sensors monitoring the aircraft orientation.

The present invention has been designed to provide a raster display, such as a liquid crystal display, capable of changing a graphics image in just a few milliseconds. The high speed graphics fill of the present invention is accomplished by use of a graphics processor and memory means in association with the graphics processor.

It has been known to use a "seed fill" technique which draws the graphics image in an individual pixel-by pixel approach. Under the method of the present invention, the graphics image is drawn using a line-by-line approach which results in a much faster response time. The present invention incorporates look-up tables into the memory means associated with the graphics processor for shortening the time the processor requires to compute mathematical relationships for creating the graphical image.

DETAILED DESCRIPTION OF PREFERRED EMBODIMENT(S)

Figure 15:
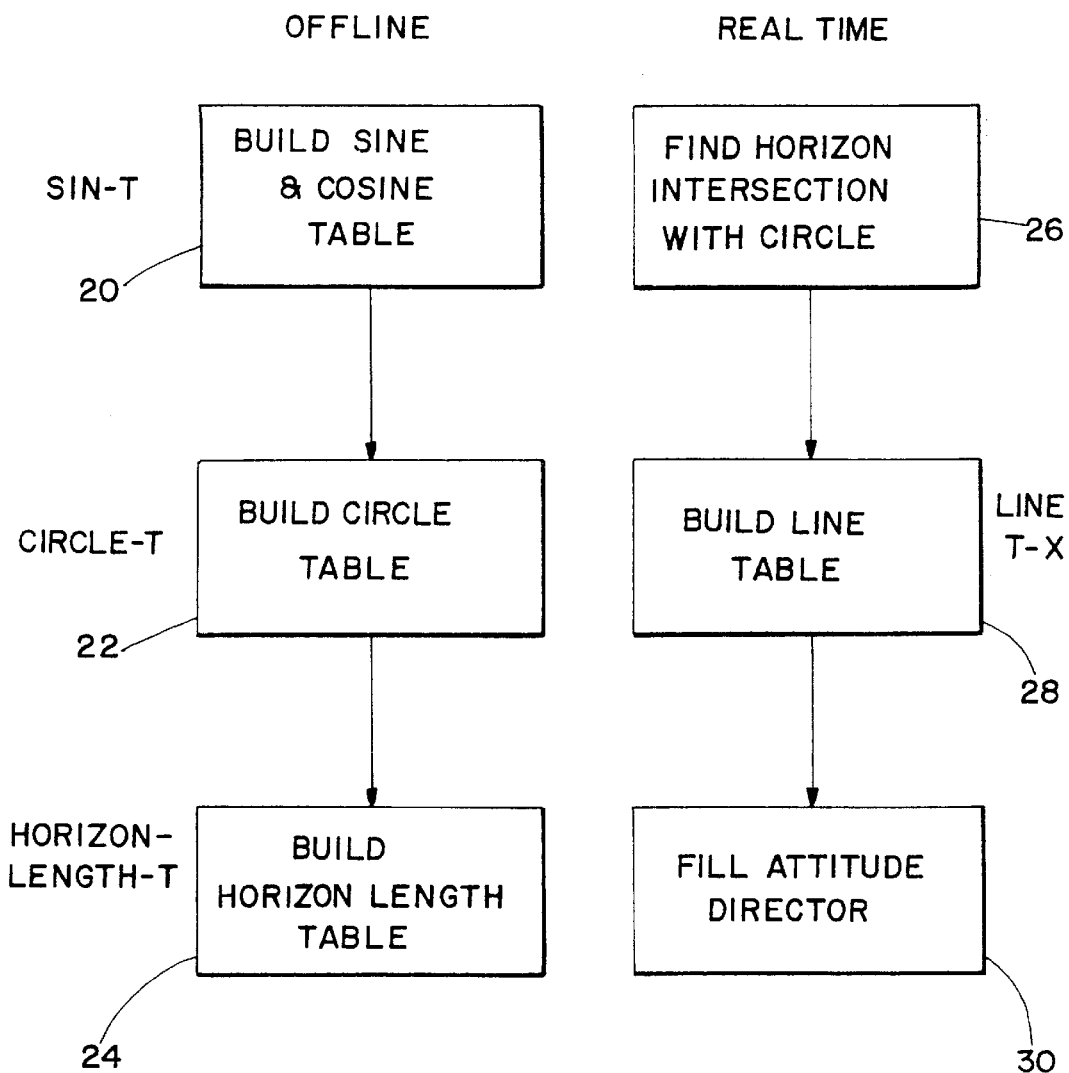
FIG. 15 shows a flow chart of off-line and real time steps of the present invention which are used to accomplish high speed graphic fill.

Referring now to the drawings, and particularly FIG. 15, an overview of the present invention will be described. Under the method of the present invention several calculations may be done off-line and prior to the need for creating a graphical image on a liquid crystal display. Once these off-line calculations are completed they may be stored in memory means associated with a graphics processor. The memory means may be one or more PROM (programmable read only memory) devices or similar devices such as RAM (random access memory) devices. When the graphics display is to be created on the screen of a liquid crystal display device the graphics processor contacts a database within its memory to obtain the results of calculations performed off-line. In one preferred embodiment of the present invention, a TI 34020 graphics processor running at 25 megahertz was used to generate the graphics display.

As FIG. 15 indicates a plurality of look-up tables are created and stored in the database of the memory means. Sine and cosine tables 20, a circle table 22, and a horizon length table 24 may be created off-line and will be described in greater detail hereinafter. The computations that the graphics processor may accomplish during real time creation of the image include the horizon line intersection with the circle 26, the build line table 28, and the fill attitude director 30.

Figure 1:
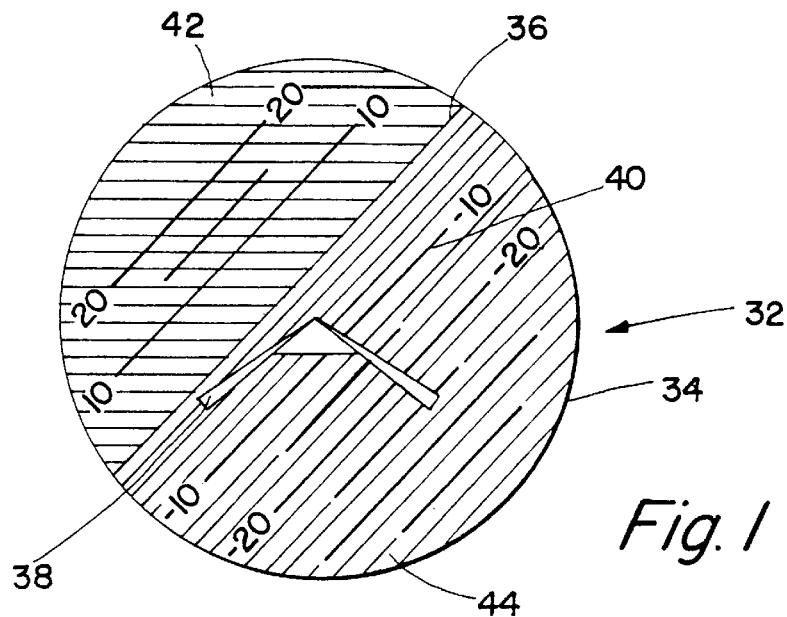
FIG. 1 shows a display of an attitude direction indicator for an aircraft.

The method of the present invention is designed to fill an area on a display, for example an area between a circle and an intersecting line, rapidly. This use can be especially helpful in the application of an attitude direction indicator for an aircraft. where a circle is needed to show the pitch and/or roll of an aircraft. FIG. 1 shows a completed image on a graphics display 32 of an attitude direction indicator. The display 32 image comprises a circle 34 and a horizon line 36. The display further comprises a representation 38 of an aircraft indicating the position of the aircraft with respect to the horizon. The display may include a graduated scale 40 to provide the pilot with more detailed information concerning the degree of pitch and/or roll of the aircraft. Ordinarily, the circle will comprise two background colors. One color 42 will fill above the horizon line and the second color 44 will fill the area below the horizon line.

Figure 2:
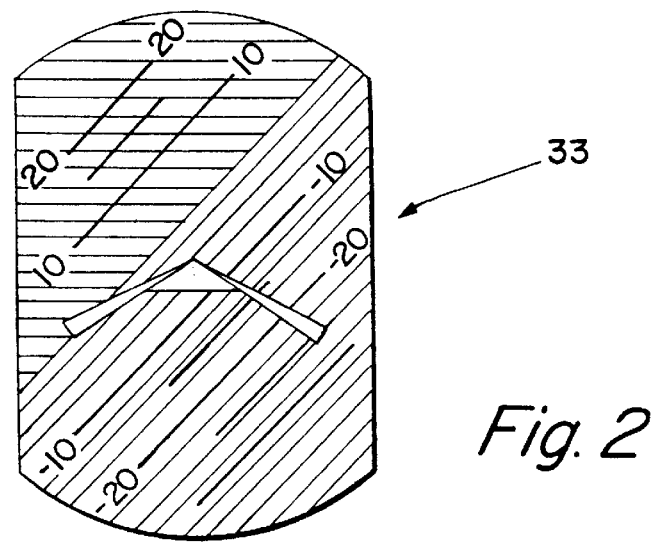
FIG. 2 shows a different geometry for the graphics image displayed in FIG. 1.

The presence or absence of color is not critical to the invention and neither is the geometry of the image. Although for purposes of this example the image will be described as a circle, the image 33 could also be that as shown in FIG. 2, or of several other shapes.

As shown in FIG. 15 one of the look-up tables that may be constructed off-line and stored in memory is a sine and cosine table 20. In order to hold the sine of zero to 360°, the table will have 3601 entries for an accuracy level of a tenth of a degree. For example, entry zero would hold the sine of zero while entry one would hold the sine of 0.1 and so forth until entry 3600 holds the sine of 360.0 The tables preferably will not use floating point numbers, therefore, entry 0 would equal the sine of 0×65536 (the lower case "x" as used herein means to multiply). This equals 0. Entry one would equal the sine of 1/20 of 1°×65536. This would equal 114. Entry two would equal the sine of 2/10×65536. This equals 229. This continues to entry 3600 which is equal to the sine of 360×65536. This once again equals 0.

To save memory in this look-up table, it is worthwhile to note that the cosine of an angle is equal to the sine of that angle plus 90°. Therefore, if the table is made to hold 90° more, a single table can be used for both functions.

Figure 3:
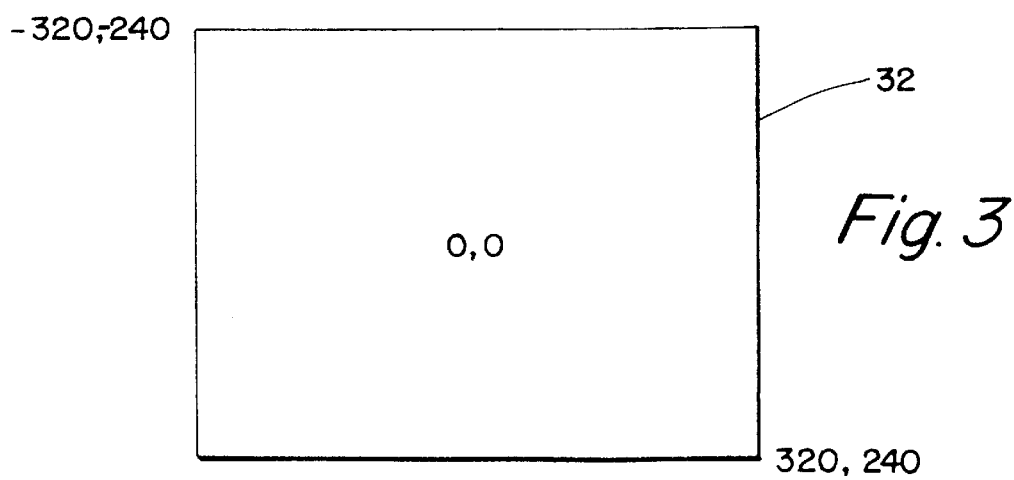
FIG. 3 shows the beginning X, Y coordinates of a blank display.
Figure 4:
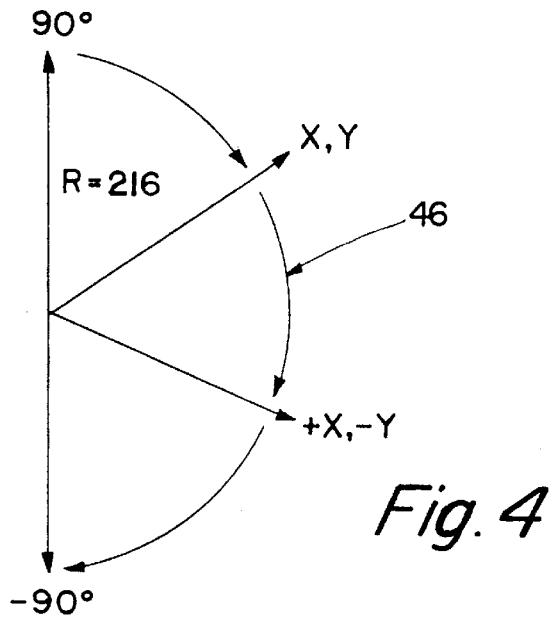
FIG. 4 shows the building of the right half of a circle image.

Another of the look-up tables that may be created off-line and saved in the memory means is the circle table 22. The circle table is based on the equation X2 plus Y2=R2, wherein R is the radius of the attitude direction indicator. Referring to FIG. 3, the coordinates X and Y may be assigned the values 0, 0 at the center of the display 32. The table will hold the values for one-half 46 of the circle, such as the right half shown in FIG. 4. The left half of the circle is a reflection in the minus X direction. The bottom half could also be a reflection of the top half, or the minus Y direction. In the preferred embodiment, however, the whole table is built. As the circle is mathematically created in the look-up table, it does so by finding the X,Y point at the end of vector R centered around 0, 0, while vector R rotates 180°. X is equal to R×the cosine of angle theta while Y is equal to R×the sine of the angle theta. For purposes of this example, the length of vector R is equal to 216.

Since liquid crystal displays are actually an array of individual pixels the circle table starts at 90° and changes the angle in a small enough step each time to get an X pixel on each Y line. In other words, if the table began at 90° and calculated X=R×cosine of theta; or X=216×cosine of 90°; Y=R×sine of theta; or Y=216×sine of 90°; then, X=0 and Y=216. If the angle were then changed from 90° to 80°, X=216×cosine 80°; and Y=216×sine 80°; so that X=approximately 38 and Y=approximately 213.

Figure 5:
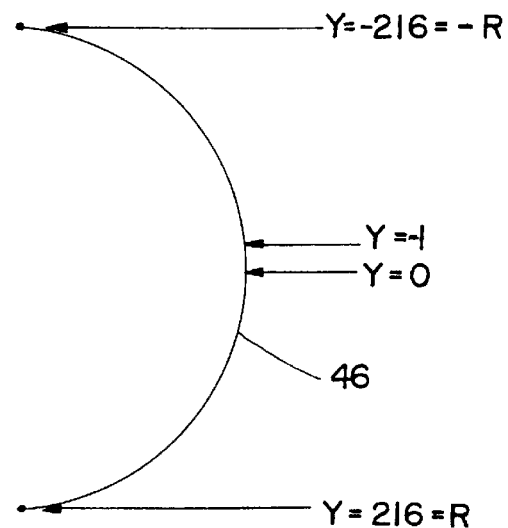
FIG. 5 shows the completed right half of the circular graphics image and coordinates on the image.

Continuing the building of the circle table, if the angle is incremented by a small amount, the result will be several X values on a given Y line. The calculation should find every X on every line in the circle, but preferable only store the largest X on each line on the table. When the calculations are completed, a table will have been built holding X coordinates of a circle which represent the right half of the attitude director. FIG. 5 shows the right half of the circle 46 created and various Y coordinates along the path of the right half of the circle.

Figure 6A:
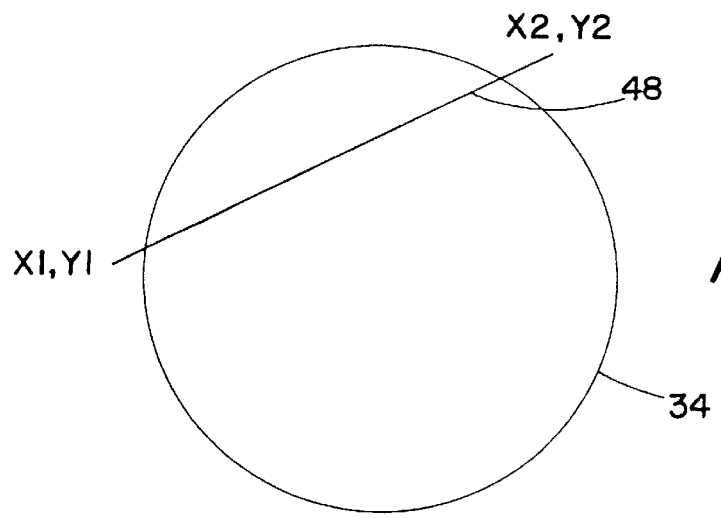
FIGS. 6A and B show a completed circle image with intercepting lines and their coordinates passing through the circle as the image continues to be created on the display screen.
Figure 6B:
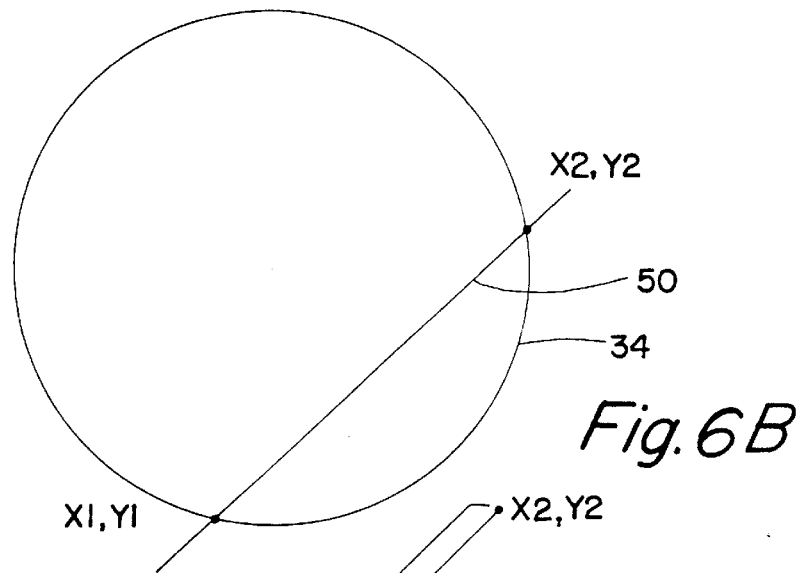
Figure 7:
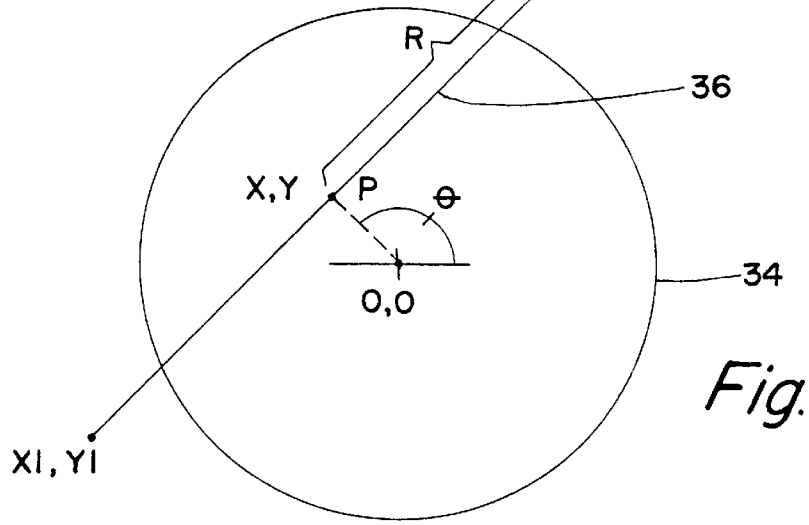
FIG. 7 shows another interim stage of the image creation and the relationship of variables associated therewith.

A third table that may be built off-line is the horizon length. As a line, such as a horizon line on an attitude direction indicator, moves through a circle, as it does displaying pitch and roll of an aircraft, the intersecting points of the line with the circle must be found. FIGS. 6A and 6B each show a circle image 34 each having a unique intersecting line 48, 50 and its respective coordinates on the circle. FIG. 7 shows a circle image 34 and a horizon line 36 intersecting the image. The angle theta is the degree of roll of the aircraft while P is the pitch of the aircraft. R represents the radius of the attitude director. The relationship of the several variables are as follows: X=P×cosine of the angle theta; Y=P×sine of theta; X(1)=R×cosine of (theta+90)+X; Y(1)=R×sine (theta+90)+Y; X(2)=R×cosine (theta−90)+X; Y(2)=R×sine (theta−90)+Y. The length of the line from X(1), Y(1), to X(2), Y(2), is equal to the diameter of the attitude director. The points X(1), Y(1), and X(2), Y(2), only lie on the circle when the pitch is equal to 0.

Figure 8:
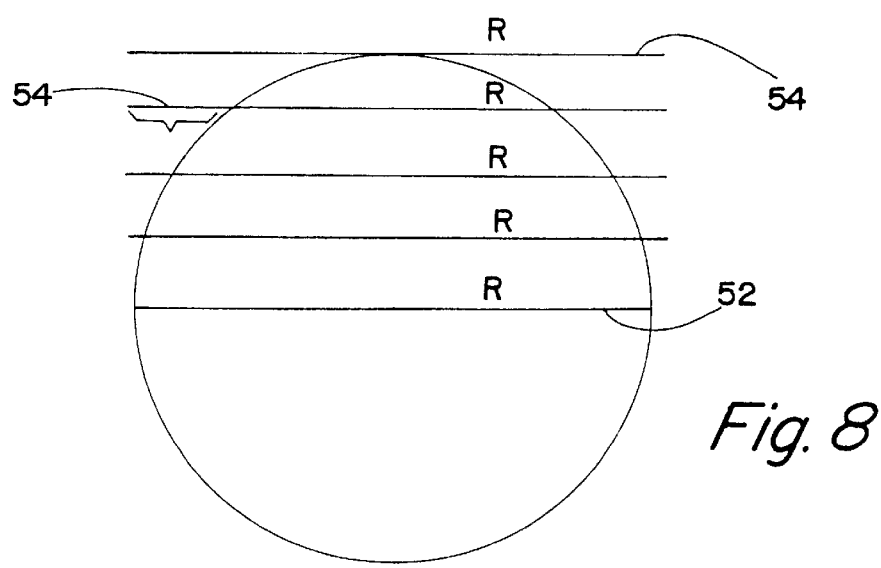
FIG. 8 shows the progression of a line at 0° moving through the circular image.

FIG. 8 shows a line moving through a circle while the line stays at 0°. The amount the line overhangs the circle is 0 at Y=0 (which is the line representing the equator 52) and R at Y=R (the line representing the north pole tangent parallel to the equator). The length 54 is not linear from 0 to R. Instead, it follows the cosine function. Thus, at 0°, the X length is: R×cosine (0)=216 (this is the situation when the airplane is sitting on the runway having 0° of pitch); at 45°, R×cosine (45) equals approximately 153; and at 90°, R×cosine (90)=0 (which is the situation when an airplane is flying directly vertical). If the circle table was built from side to side as opposed from top to bottom, then the horizon length table would use the sine function for the length instead of cosine.

Figure 9:
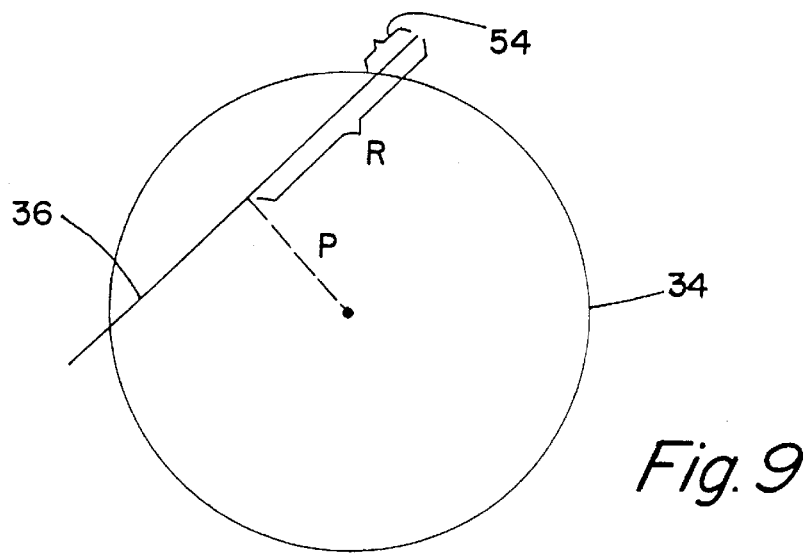
FIG. 9 shows the circular image and a horizon line at a roll of 45° and a pitch of 45°.
Figure 10:
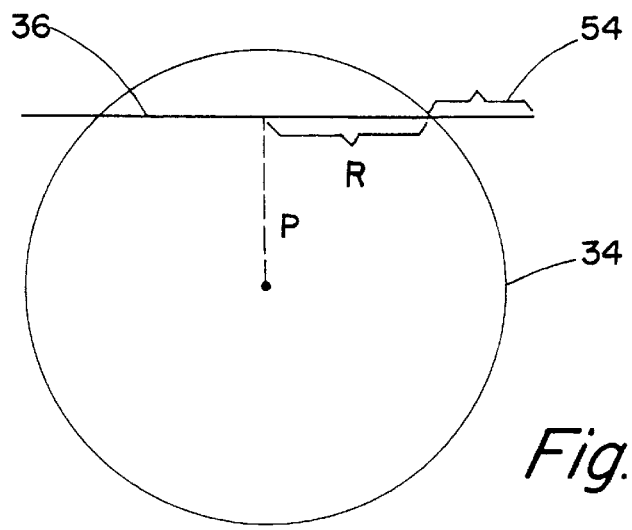
FIG. 10 shows the horizon line on the circle image at a roll of 0° and a pitch of 45°.

A table may be built using the cosine function for providing a look-up database of the length dimension that is valid for any angle of roll of the aircraft. For example, as shown in FIG. 9 a horizon line 36 is shown at a roll of 45° and a pitch of 45°. In FIG. 10 the horizon line 36 is shown at a roll of 0° and a pitch of 45°.

Figure 11:
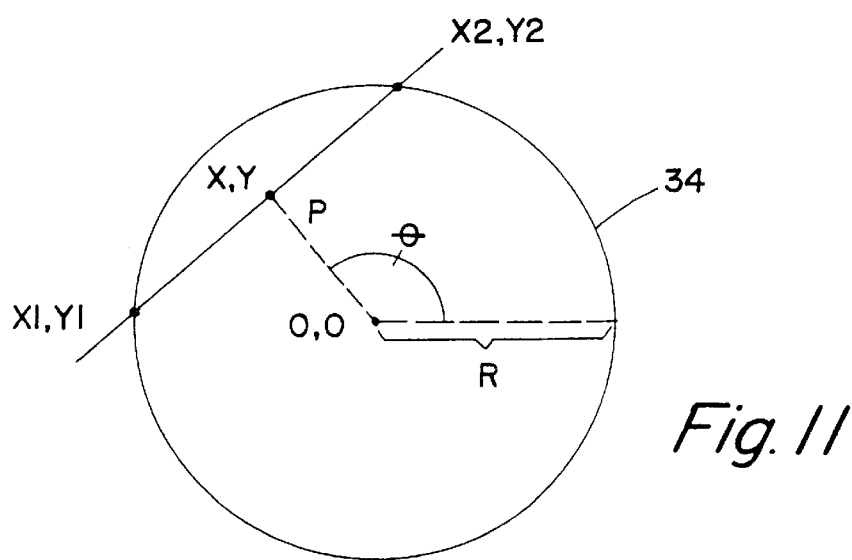
FIG. 11 shows the coordinate relationships where the horizon line intercepts the circle image.

Although the pitch for an aircraft is measured in degrees, this can be converted to pixels. For example, in an attitude direction indicator of size 432, it can show the pilot 36° of pitch. Therefore, 1° is equal to 12 pixels in this example. The equations which yielded the endpoints of the horizon line through the circle, may be modified to use this new table to find the intersection of the horizon line with the circle. In FIG. 11, the pitch P=15°, the radius R=216°, and the roll theta=45°. The following relationships would then exist: Pp (pitch in pixels)=P×12=180 pixels of pitch; L (length)= length table value at (Pp); X=Pp (sine table value at [450+ 900]); Y=Pp (sine table value at [450]) (remember that 450 is the 45.0 degree entry in the table); X(1)=L (length)×(sine table value at [450+900+900]) (divided by 16)+X; Y(1)=L (length)×(sine table value at [450+900]) (divided by 16)+Y; and X(2)=(L)×(sine table value at [450−900+900]) (divided by 16)+X; and Y(2)=(L)×(sine table value at 450−900] (divided by 16)+Y.

Figure 12:
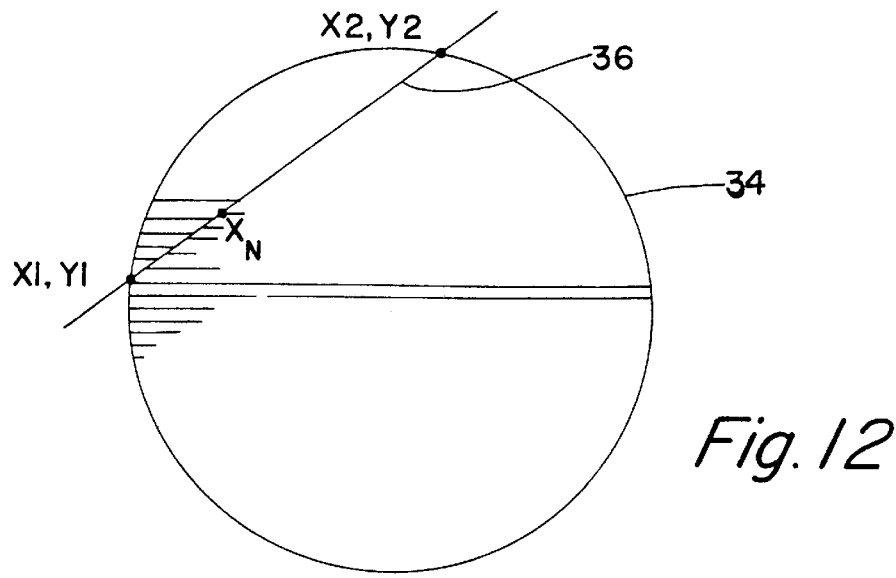
FIG. 12 shows the circle image and the beginning of the creation of the lines that will fill the circle.
Figure 13:
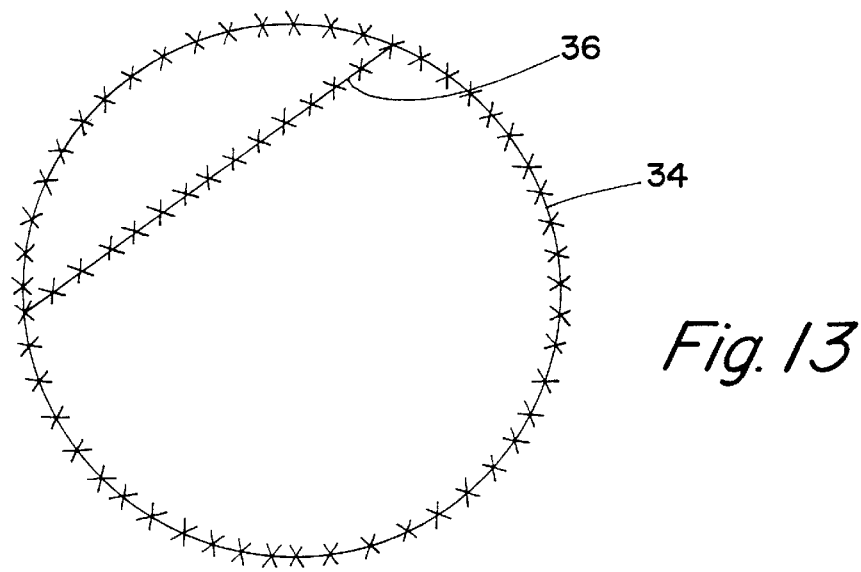
FIG. 13 depicts the circle image and the horizon line and all of the points thereon which are identified by their respective coordinates.
Figure 14:
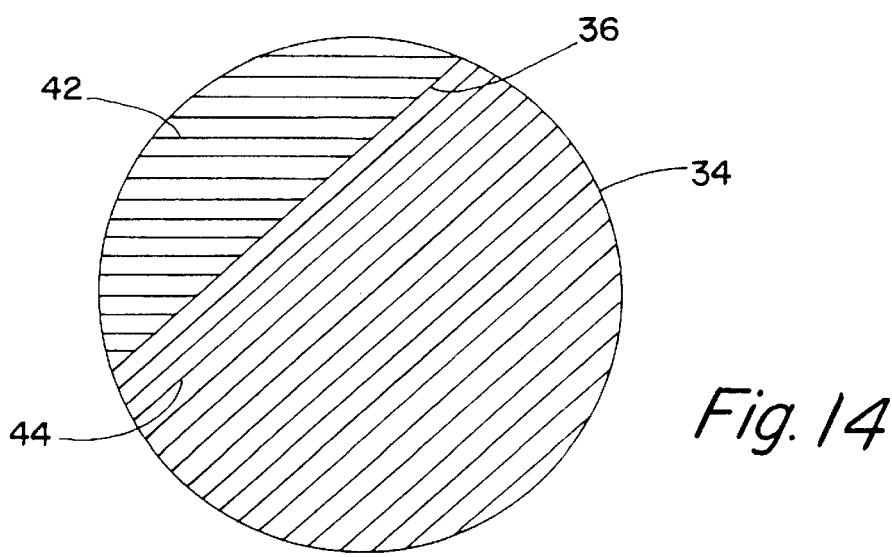
FIG. 14 shows the circle image filled with lines of two different colors.

Now that the look-up tables which may be created off-line have been created, the real time or on-line tables may be built. One such table will hold X coordinates. By this time the look-up tables have found the intersection of the horizon line with the circle display as shown in FIG. 12. For each Y point on the horizon line inside of the circle, there exists an X point which needs to be identified in the line table. A known algorithm is used to plot this line, commonly referred to as Bresenham's Algorithm. In one embodiment of the present invention instead of the algorithm drawing the line on the display, it places the X value derived from the algorithm in the line table of the present invention. Using this technique a processor can draw a line in just a few microseconds. This routine will then fill the attitude direction indicator with several line function calls. As shown in FIG. 13, we have now calculated every point around the attitude direction indicator circle, on every Y line. Also known as the X coordinate on each of these Y lines where the intersecting horizon is located. Next the line function built into the graphics processor is called to connect the edges of the circle with lines extending to the intersecting horizon line. First, preferably one portion of the circle is connected to the intersecting horizon line with a plurality of lines of one color, then on the other side of the horizon, lines fill the other portion of the circle with a second color as shown in FIG. 14. If the horizon line had moved outside the circle entirely, the circle would have become one color filled with lines.

The present invention may be embodied in other specific forms without departing from its spirit or central characteristics. The above described embodiments are to be considered in all respects as illustrative and not restrictive. The scope of the invention is indicated by the claims rather than by the foregoing description., and all changes which come within the meaning and scope of the equivalents of the claims are captured by the claims.

What is claimed is:

1. A method for increasing the speed at which a graphics image is displayed on a display, the method comprising the steps of:

provifding a graphics processor capable of creating an image on said display;

providing memory in association with said graphics processor;

creating a look-up table for a predetermined geometric shape and storing said look-up table in said memory;

determining a first angle of orientation of an object to be graphically represented;

establishing a first line corresponding to said first angle;

creating a line length table to provide a line length for lines intersecting said shape from a vertical axis horizontally to said shape's perimeter or from a horizontal axis vertically to said shape's perimeter;

computing intersection points of said first line with said shape's perimeter, and displaying said shape and said first line on said display, said first line defining first and second portions of said shape;

creating a plurality of fill lines each of said fill lines connecting a respective point on said first intersecting line with a respective point on said shape; and, filling said first portion with said fill lines.

2. The method of claim 1, further comprising:

filling said second portion with said fill lines.

3. The method of claim 2, wherein said fill lines in said first portion are of a first color and said fill lines in said second portion are of a second color.

4. The method of claim 1, wherein said shape is a circle.

5. The method of claim 1, wherein said first line is a representation of the earth's horizon as it relates to the orientation of an aircraft in flight.

6. The method of claim 1, wherein said raster is an aircraft attitude direction indicator.

7. A method for increasing the speed at which an image for use in an aircraft attitude direction indicator is displayed on a raster, the method comprising the steps of:

creating a look-up table for a shape and storing said look-up table in a memory associated with said raster;

creating a line length table to provide a line length for lines intersecting said shape from a vertical axis horizontally to the perimeter of said shape or from a horizontal axis vertically to the perimeter of said shape, and storing said line length table in a memory associated with said raster;

determining pitch of said aircraft at a moment in time, to establish a horizon line corresponding to said pitch;

computing intersection points of said horizon line with said shape;

displaying said shape and said horizon line on said raster, said horizon line defining first and second portions of said shape;

creating a plurality of fill lines, each of said fill lines connecting a respective point on said horizon line with a respective point on said shape;

filling said first portion of said shape with said fill lines of a first color; and filling said second portion of said shape with said fill lines of a second color.

8. The method of claim 7, further comprising the step of displaying a representation of an aircraft on said raster to indicate the position of said aircraft with respect to the horizon.

9. The method of claim 7, further comprising the step of displaying a graduated scale on said raster to reveal relative degrees of pitch and roll.

* * * * *